United States Patent [19]
Labat

[11] Patent Number: 4,728,447
[45] Date of Patent: Mar. 1, 1988

[54] PROCESS AND PRODUCT FOR DISSOLVING SULFUR

[75] Inventor: Yves Labat, Pau, France

[73] Assignee: Societe Nationale Elf Aquitaine, France

[21] Appl. No.: 804,665

[22] Filed: Dec. 3, 1985

[30] Foreign Application Priority Data

Dec. 3, 1984 [FR] France .................................. 84 18388

[51] Int. Cl.$^4$ .......................... E21B 37/00; C23G 5/02
[52] U.S. Cl. ................................. 252/8.552; 166/312; 299/5
[58] Field of Search ................. 252/8.3, 8.55 B, 8.552; 166/312; 299/4, 5; 568/19, 21, 26

[56] References Cited
U.S. PATENT DOCUMENTS

| | | | |
|---|---|---|---|
| 3,039,855 | 6/1962 | Urban | 568/26 |
| 3,375,192 | 3/1968 | Rowlinson | 252/8.55 |
| 3,531,160 | 9/1970 | Fisher | 299/5 |
| 3,846,311 | 11/1974 | Sharp et al. | 252/8.55 |
| 3,909,422 | 9/1975 | Sample | 252/8.55 |
| 4,213,866 | 7/1980 | Ashby et al. | 252/8.55 X |
| 4,239,630 | 12/1980 | Atkinson et al. | 252/8.55 |
| 4,290,900 | 9/1981 | Sharp et al. | 252/8.55 |
| 4,355,183 | 10/1982 | Nash et al. | 568/62 X |

Primary Examiner—Herbert B. Guynn
Attorney, Agent, or Firm—Ostrolenk, Faber, Gerb & Soffen

[57] ABSTRACT

A solvent for sulfur consisting of a dialkyl disulfide which is free of any basic substance. It is obtained from a commercial dialkyl disulfide by treatment with a reagent capable of eliminating or blocking the basic substances, particularly amines, which are customarily present in such a product. This reagent may be an acid.

The use of the product, after treatment in this manner, for dissolving sulfur which has deposited in the casings of natural gas wells permits the reuse several times of the dialkyl disulfide employed.

16 Claims, No Drawings

PROCESS AND PRODUCT FOR DISSOLVING SULFUR

The object of the invention is a method and product for dissolving sulfur, particularly deposits of sulfur which may be present in pipes serving for the conveyance of sulfur materials.

In certain cases of industries which process substances which liberate elementary sulfur, difficulty is encountered in the conveying of these substances due to the deposits of sulfur which have formed on the inner walls of the pipes. These deposits, which are disturbing first of all due to the increase in the loss of head in the passage of the materials processed, may reach such an extent that such passage becomes partially or completely obstructed. A particularly important case is present in sulfur-rich gas wells. With such hypersulfurated gases, difficulties due to the deposit of sulfur on the inner walls of the casings may even reach the extent of obstructing the conduits. It is therefore necessary to eliminate the sulfur deposit and the most practical means—which is furthermore currently used in the industry—consists in dissolving the deposits of this element by means of a suitable solvent.

However, the applications of the present invention are not limited to this particular case. The process and product of the invention can be employed in any installation in which sulfur deposits have a tendency to form. They can also be used for forming of sulfur-rich solutions capable of giving up this element in the desired forms and finenesses, for the preparation of various sulfur compositions, such as, for instance, dispersions or emulsions for agriculture.

The dissolving of deposits of sulfur has been effected in the past with the use of solvents such as carbon disulfide, alkyl sulfides, dialkyl disulfides or aqueous solutions of ammonium sulfides. Although $CS_2$ is in fact an excellent solvent for sulfur, it is expensive. The alkyl sulfides are of relatively low solvent power, while the ammoniacal solutions, which do not produce a simple physical solution but polysulfides, require a further treatment which is complicated and finally uneconomical.

The dialkyl disulfides used in the prior art are effective for the elimination of deposits of sulfur when they are used under certain given conditions. Thus, according to U.S. Pat. No. 3,846,311, dialkyl disulfides and particularly those having $C_2$ to $C_{11}$ alkyls, namely $C_2H_5SSC_2H_5$ to $C_{11}H_{23}SSC_{11}H_{23}$ have a strong dissolving power when amine is added to them, in particular in an amount of 10% by weight, and when they are then left to "age" at 24° C. for 30 to 90 days. In accordance with this prior art, up to 564 g of S per 100 g of dialkyl disulfide at 93° C. are then dissolved.

The rapidity of the dissolving would greatly increase, according to U.S. Pat. No. 4,239,630, by the prior addition of a small amount of elementary sulfur to the dialkyl disulfide plus amine system.

Despite the good solubilities noted in the prior art, the applicants have found that this use of the dialkyl disulfides is not sufficiently economical. It happens, as a matter of fact, that most of the dissolved sulfur combines to give polysulfides having more than 2 atoms, for instance 4 to 5; the combined sulfur therefore does not precipitate upon the cooling of the solution and the polysulfide formed can no longer serve for a new dissolving of the sulfur when its value X in $S_X$ is too high.

It follows that the dialkyl disulfide employed cannot be reused directly; a possible special further treatment in order to restore it to the form R-SS-R, with recovery of sulfur, requires additional operations which are relatively laborious and greatly increase the operating expenses.

Thus, it has been found not advantageous in the processes described above to have up to 560 g of S dissolved by 100 g of disulfide since the major part of this sulfur passes into the state of polysulfide, which can no longer be recycled for a new dissolving.

The present invention is based on the unforeseen fact that in order to obtain a sulfur solution which permits reprecipitation of the sulfur in elementary state and the recover of the remaining liquid for a new dissolving of fresh sulfur, not only is it not necessary to add amine to the dialkyl disulfide used but it is advisable to eliminate from it any amine compound which might be present therein due to the production of dialkyl disulfide in the presence of an amine as catalyst.

The applicant has in fact found that in the absence of any amine or other basic substances, the dialkyl disulfides dissolve sulfur, with no or with very little formation of polysulfide, at temperatures between room temperature and 100° C. It is then possible to recrystallize by cooling practically all of the sulfur thus dissolved, while the major part, about 90% or more mother liquor, can be used again for another dissolving, that is to say, for instance, another cleaning of a pipe which is fouled by deposits of sulfur.

Since the commercial dialkyl disulfides, and in particular dimethyl disulfide DMDS, known under the name of MEROX solvent, are produced by the action of sulfur on the corresponding mercaptans in the presence of basic catalysts, the disulfides found on the market contain traces of these catalysts. Now, unexpectedly, if one eliminates these basic substances, the liquid dialkyl disulfides permit the obtaining of the results set forth in the preceding paragraph.

The process of the invention for the dissolving of sulfur by means of liquid dialkyl disulfides with recovery of these disulfides is therefore characterized by the fact that the dialkyl disulfide or disulfides used are free of any basic substance.

According to a special feature of the invention, it is preferable that the dialkyl disulfide, which is free of basic compounds, contain a very small amount of an acid, in particular 0.001 to 0.1% by weight.

The dissolving of the sulfur is effected in known manner, preferably by agitating the solvent liquid in contact with the sulfur between room temperature and 100° C.; it is preferable to operate between 50° and 90° C.

One feature of the invention which is not required but is preferred consists in stopping the dissolving well before the maximum possible concentration of sulfur which has been reached in the solution. In this way, the occurrence of the chemical reaction, that is to say the formation of polysulfide, is reduced and the recovery of the solvent is facilitated. While at high temperatures within the range indicated above, the DMDS solvent can dissolve up to about 7 times its weight of sulfur, it is preferable in accordance with the invention, to let it dissolve only one to three times its weight of sulfur and, in particular, two times. Expressed with reference to the weight of sulfur present in the molecule of a dialkyl disulfide, these ratios represent about 1.5 to 4.5 times the weight of the sulfur contained in the molecule of the solvent.

As the invention is applicable to different dialkyl disulfides, the above preferred limits of 1.5 to 4.5 g of dissolved S per gram of S bound to the alkyls apply whatever the alkyls are. The optimum quantity of dissolved sulfur is about 2.5 to 3.5 g per gram of S of the dialkyl disulfide.

Although dimethyl disulfide, DMDS, is particularly suitable, the invention can be carried out with various other liquid disulfides or liquid mixtures. In general, one can employ liquid compounds RSSR in which the R's are $C_1$ to $C_{18}$ alkyls or liquid mixtures of such compounds. As in the prior art, dialkyl disulfides whose R radical is $C_2H_5-$ to $C_{11}H_{23}-$ as well as their mixtures are particularly well suited.

The invention also comprises a process for making the commercial dialkyl disulfides suitable for use for the dissolving of sulfur. This process is characterized by treating the dialkyl disulfide with a reagent capable of reacting with and eliminating or blocking the basic substance contained in the commercial dialkyl disulfide.

When the basic substance is an amine, it can be blocked by the addition of carbon disulfide which transforms it into a thiourea derivative. An isocyanic ester can be used in order to transfer the amine into a substituted urea; thus, methyl, ethyl, phenyl or tolyl isocyanate can be used. Recourse can possibly be had to an aldehyde in order to block the amine, in particular formaldehyde.

However, the simplest and most economical method according to the invention, consists in treating the dialkyl disulfide with an aqueous solution of an acid in sufficient amount to completely neutralize the basic substances which it contains.

The treatment with aqueous acid is followed by separation of the aqueous layer and possibly washing with water.

Any acid which does not react with the disulfide can be used for the treatment according to the invention. Thus, one can employ an aqueous solution of one or more acids such as hydrochloric, sulfuric, sulfurous, phosphoric, perchloric, acetic, lactic, tartaric, oxalic acid, etc.; the strong inorganic acids are preferred in order to be certain of eliminating all basic substances and particularly amines, from the product treated.

As acid compounds, one can also use acid salts, Lewis acids and/or metalloid halides, for instance sulfur chloride, phosphorus chlorides, boron fluoride, etc., generally in an amount of 0.005 to 5% of the weight of disulfide, and preferably 0.01 to 2%.

Depending on the nature and concentration of amine or other basic substance in the dialkyl disulfide, the aqueous solution of acid has a greater or lesser concentration of acid. In general, acidities of 0.05 N to 2 N and in particular from 0.1 N to 1 N are well suited.

The treatment can be carried out at temperatures of about 0° C. to 50° C. and in particular at room temperature.

The invention is illustrated—but not limited—by the following examples:

EXAMPLE 1

Use of commercial dialkyl disulfide, DMDS, as is

Into a 3-liter reactor provided with an agitator and external heating means there are introduced 1000 g of commercial DMDS, $CH_3S_2CH_3$, and 7000 g of sulfur. The mixture is brought to and held at 80° C. with continuous agitation until all the sulfur has dissolved. The content of the reactor is then poured into a sedimentation vessel in which it is cooled to room temperature, which has the effect of precipitating solid sulfur. When this precipitation has ceased, the liquid is separated from the deposited solid. In this way there are collected 1987 g of liquid formed of dimethyl polysulfides of the average composition $$CH_3S_{4.9}CH_3,$$

and furthermore 5513 g of sulfur, namely only 78.7% of the 7000 g of S used.

In fact, 987 g of S combined with the DMDS to transform the latter into the $S_{4.9}$ polysulfide. Furthermore, about 500 g of S remained in solution in the 1987 g of polysulfide at 25° C.

It may be pointed out that the obtaining of the 5513 g of S, namely about 550 g per 100 g of initial DMDS, is in agreement with the prior art cited above.

However, the polysulfide formed can no longer serve more than a single time, with an even lower yield of sulfur; its recycling is equivalent to a loss of 30% of initial DMDS.

EXAMPLE 2

Use of DMDS treated in accordance with the invention

In the same apparatus and employing the same manner of operation as in Example 1, sulfur is dissolved in a DMDS obtained from the same commercial product by treatment with acid. This treatment consisted in agitating 1000 g of commercial dialkyl disulfide with 1000 ml of a 1% aqueous solution of HCl; after decantation, the layer of DMDS was separated from the aqueous layer and used for the dissolving of the sulfur. To 1000 g of dimethyl disulfide obtained in this manner, there were added 2000 g of sulfur, namely 2.94 g of S per gram of sulfur of constitution of the disulfide (as compared with 10.3 g S/g in Example 1), and the mixture was agitated at 80° C. until the sulfur was completely dissolved.

Upon cooling to 25° C. and separation of the liquid, 1099 g of the latter are collected, which is in accord with the average formula $$CH_3S_{2.3}CH_3.$$

The weight of sulfur separated, 1818 g, represents 91% of the sulfur used (as compared with 78.7% in Example 1). The polysulfide of low S content formed had retained 99 g S, while about 80 g of sulfur remained in solution at 25° C. after the crystallization of the S.

The slightly persulfuretted DMDS can be reused more than 90% for subsequent operations.

The advantages are thus evident which result from the fact that, in accordance with the invention, the DMDS leads to a low combination of the sulfur in polysulfide $CH_3S_{2.3}CH_3$, while in the prior art the content of S is more than doubled, $CH_3S_{4.9}CH_3$.

I claim:

1. A method of dissolving sulfur from a sulfur eposit, which comprises the steps of:
    (a) contacting a liquid dialkyl disulfide with a reagent which reacts with and removes or blocks the basicity of basic substances contained in the liquid;
    (b) contacting the sulfur deposit with the treated liquid dialkyl disulfide, the liquid being kept at a temperature of 50° to 100° C.;

(c) maintaining said liquid and the deposit in contact until 1.5 to 4.5 grams of the sulfur from the deposit is dissolved in the liquid per gram of sulfur in the dialkyl disulfide;

(d) cooling the solution thus obtained; and (e) recovering the sulfur which precipitates as a consequence of the cooling.

2. The method of claim 1 wherein the amount of sulfur dissolved is about 2.5 to 3.5 grams per gram of sulfur in said disulfide.

3. The method of claim 1 wherein the cooling is effected to ambient temperature.

4. The method of claim 2 wherein the disulfide is dimethyl disulfide.

5. The method of claim 4 wherein the liquid remaining after recovery of the precipitated sulfur is used to dissolve an additional quantity of elemental sulfur.

6. The method of claim 1 wherein the liquid remaining after recovery of the precipitated sulfur is used to dissolve an additional quantity of elemental sulfur.

7. The method of claim 1 in which the alkyl groups of said disulfide contain 1 to 18 carbon items.

8. The method of claim 1 wherein said liquid dialkyl disulfide is an amine containing disulfide and is contacted with a liquid capable eliminating the amine therefrom wherein the elimination liquid is aqueous hydrochloric acid, sulfuric acid, sulfurous acid, phosphoric acid, perchloric acid, acetic acid, lactic acid, tartaric acid or oxalic acid, or in which the elimination liquid is sulfur chloride, phosphorous chloride or boron fluoride.

9. The method according to claim 1 wherein the liquid disulfide is an amine containing disulfide and is contacted with a reagent capable of transforming the amine into a non-basic material wherein said reagent is selected from the group consisting of methyl isocyanate, ethyl isocyanate, phenyl isocyanate, tolyl isocyanate and formaldehyde.

10. The method of claim 1 wherein the deposit is in a conduit or natural gas well.

11. The method of claim 10 wherein said liquid disulfide consists of one or a mixture of disulfide of the formula RSSR where R is a 1 to 18 atom alkyl group.

12. The method of claim 11 wherein the liquid disulfide is recovered when the amount of sulfur dissolved therein is about 2.5 to 3.5 grams per gram of sulfur of said disulfide.

13. The method of claim 12 wherein the contacting temperature is 50° to 90° C. and the cooling is effected to ambient temperature.

14. A method of dissolving sulfur from a sulfur deposit, which comprises the steps of:

(a) contacting the sulfur deposit with a liquid dialkyl disulfide which has been previously contacted with a reagent which reacts with basic substances contained in the liquid to remove or block the basicity of said basic substances contained in the liquid, the liquid being in contact with the deposit at a temperature of 50° to 100° C.;

(b) maintaining said liquid and the deposit in contact until 1.5 to 4.5 grams of the sulfur from the deposit is dissolved in the liquid per gram of sulfur in the dialkyl disulfide;

(c) cooling the solution thus obtained; and (d) recovering the sulfur which precipitates as a consequence of the cooling.

15. The method of claim 14 in which the liquid disulfide is one or a mixture of disulfide of the formula RSSR where R is a 1 to 18 atom alkyl group, the contacting temperature is 50° to 90° C., the contacting is continued until about 2.5 to 3 grams per gram of sulfur of said disulfide is dissolved, and the cooling is effected to ambient temperature.

16. The method of claim 15 wherein the deposit is in a conduit or natural gas well.

* * * * *